United States Patent [19]

Ogawa et al.

[11] Patent Number: 4,660,940
[45] Date of Patent: Apr. 28, 1987

[54] SMALL-SIZED WIDE-ANGLE LENS

[75] Inventors: Ryota Ogawa, Saitama; Shigetada Sato, Tokyo, both of Japan

[73] Assignee: Asahi Kogaku Kogyo Kabushiki Kaisha-Nai, Tokyo, Japan

[21] Appl. No.: 741,434

[22] Filed: Jun. 5, 1985

[30] Foreign Application Priority Data

Jun. 5, 1984 [JP] Japan .................. 59-115755

[51] Int. Cl.⁴ .......................................... G02B 13/04
[52] U.S. Cl. .................................. 350/458; 350/459; 350/460
[58] Field of Search .................. 350/458, 459, 460

[56] References Cited

U.S. PATENT DOCUMENTS 3,870,400  3/1975  Yamashita et al. ............. 350/459 X
4,025,170  5/1977  Kawamura ..................... 350/459
4,311,367  1/1982  Mori ............................. 350/458 X Primary Examiner—John K. Corbin
Assistant Examiner—Scott J. Sugarman
Attorney, Agent, or Firm—Lyon & Lyon

[57] ABSTRACT

A retro-focus type wide-angle lens which has a large angular field of 76° to 90° and secures a sufficient amount of corner illumination comprises only five sets of lens elements including eight or nine lens elements. The first set of convergent lens located on the object side is a positive lens. The first set of divergent lenses comprises two or three separate negative lenses. The second set of convergent lenses comprises two separate positive lenses. The third set of convergent lens comprises a positive lens. These sets of lenses are designed so as to satisfy various numerical conditions as defined in the specification.

14 Claims, 16 Drawing Figures

Fig. 1.
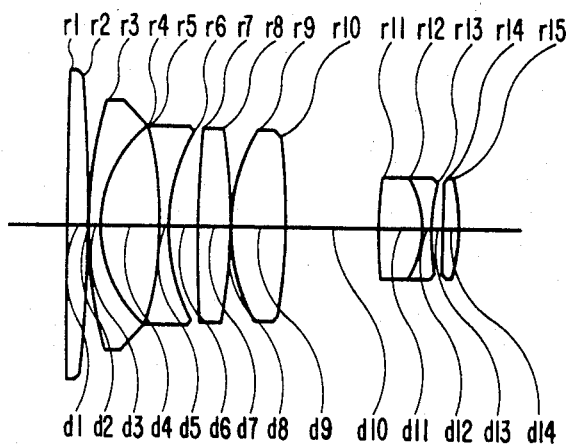
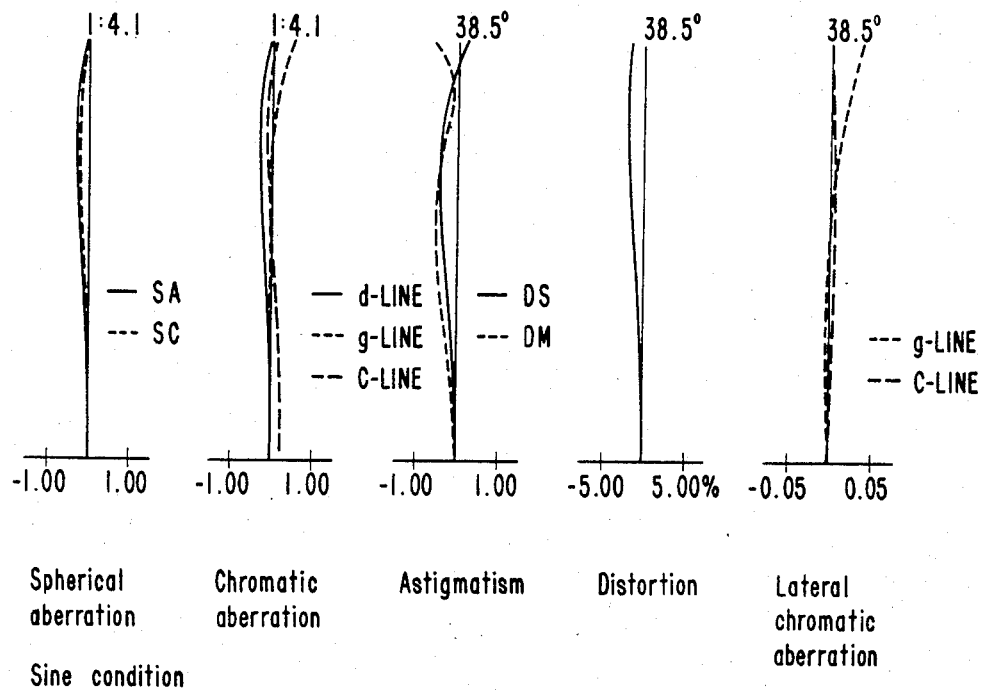
Fig. 2.

Fig. 3.
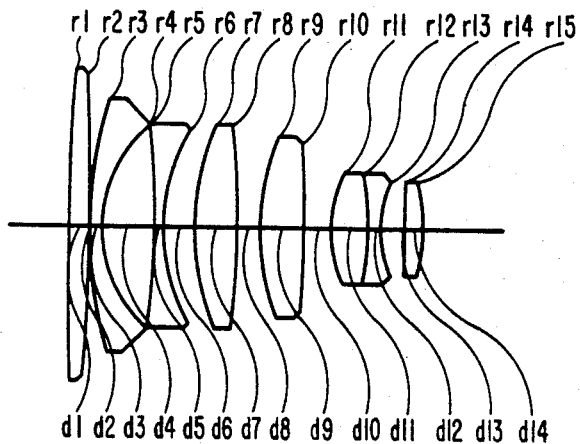
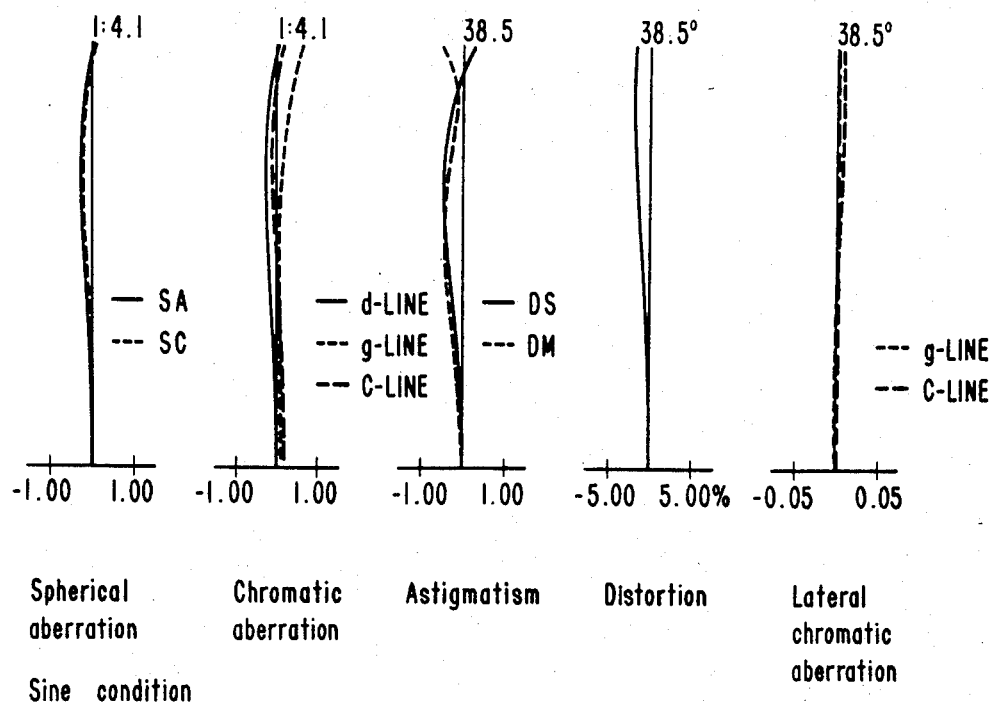
Fig. 4.

Fig. 5.
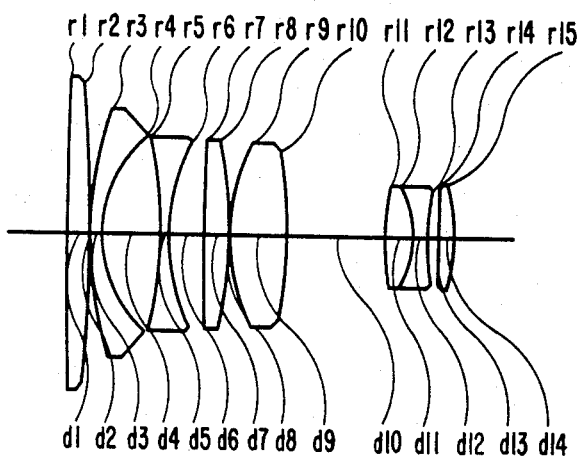
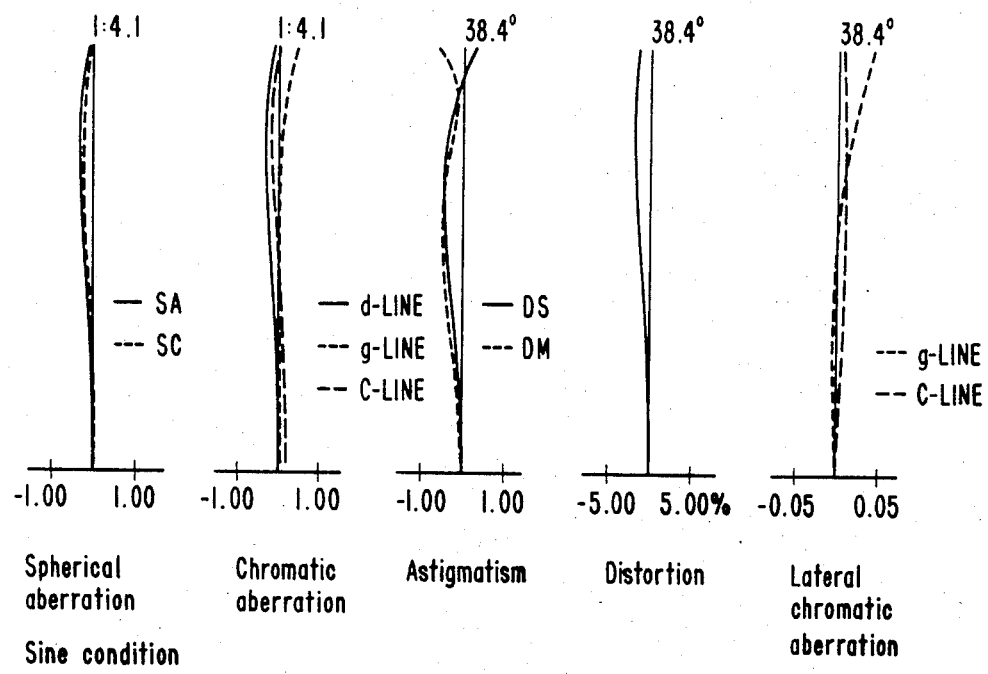
Fig. 6.

Fig. 7.
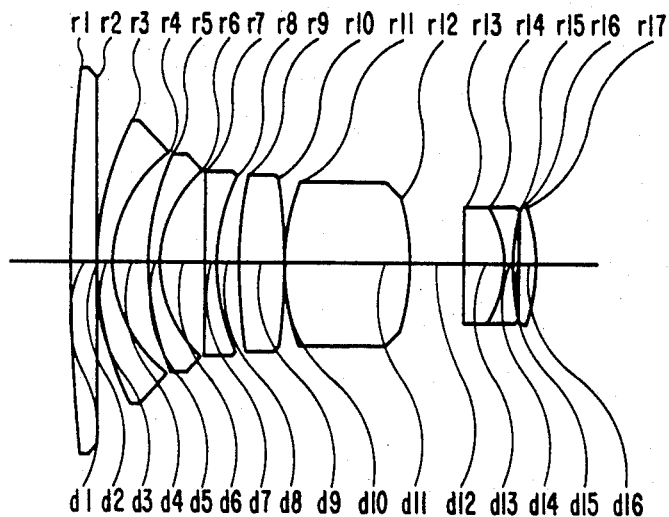
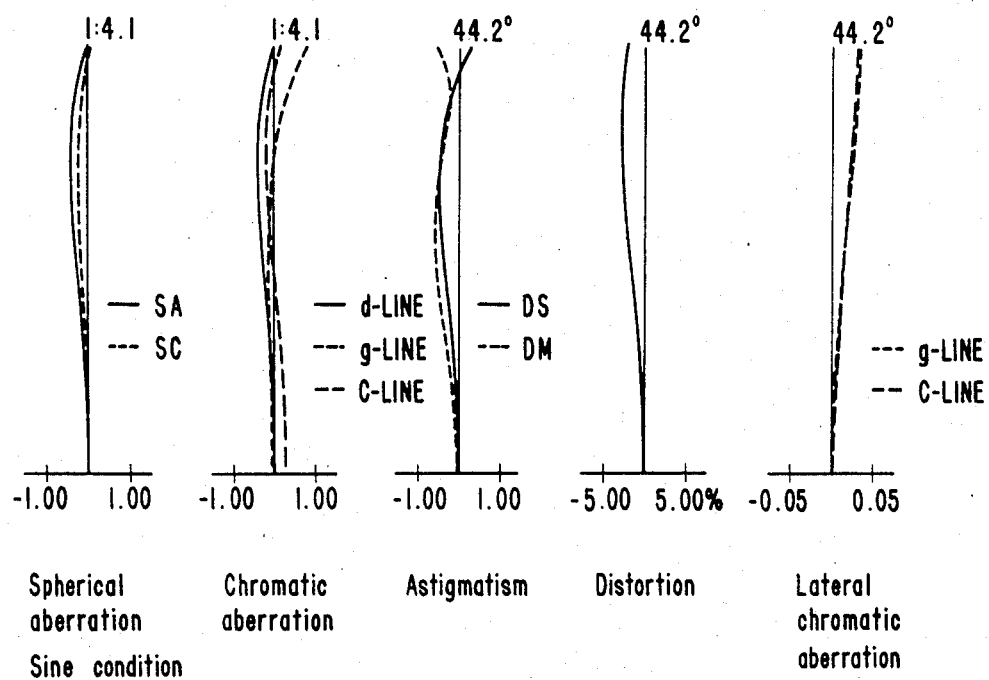
Fig. 8.

Fig. 11.
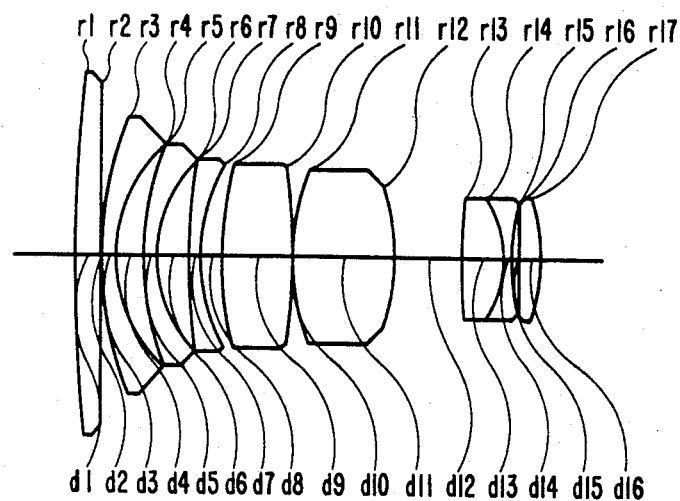
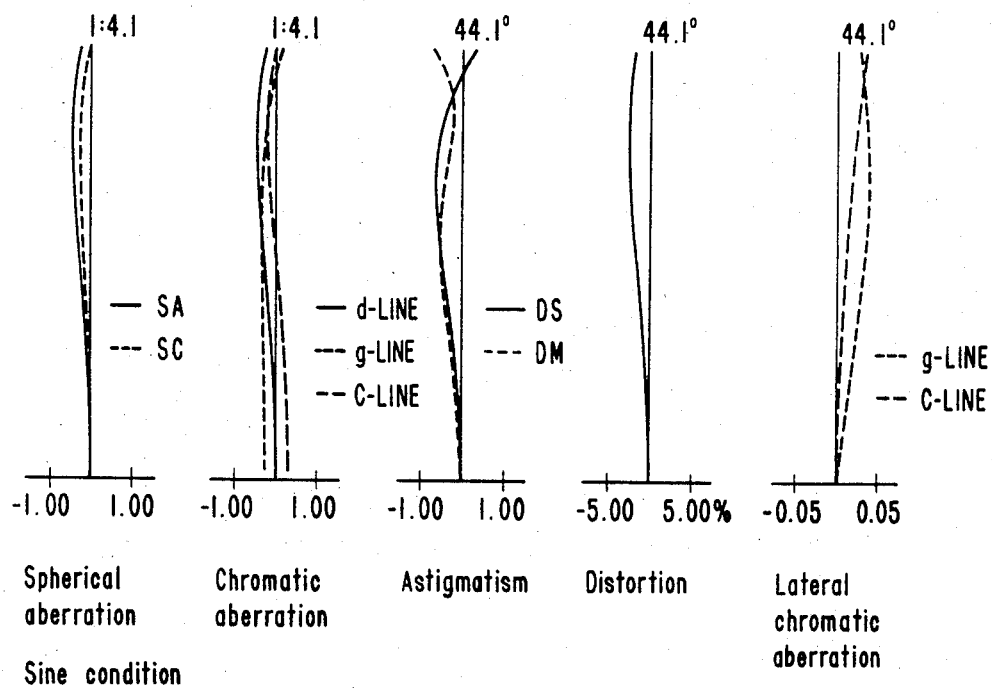
Fig. 12.

Fig. 15.
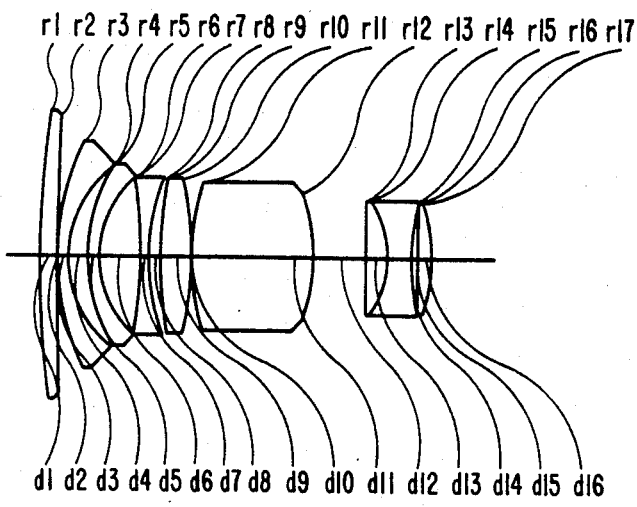
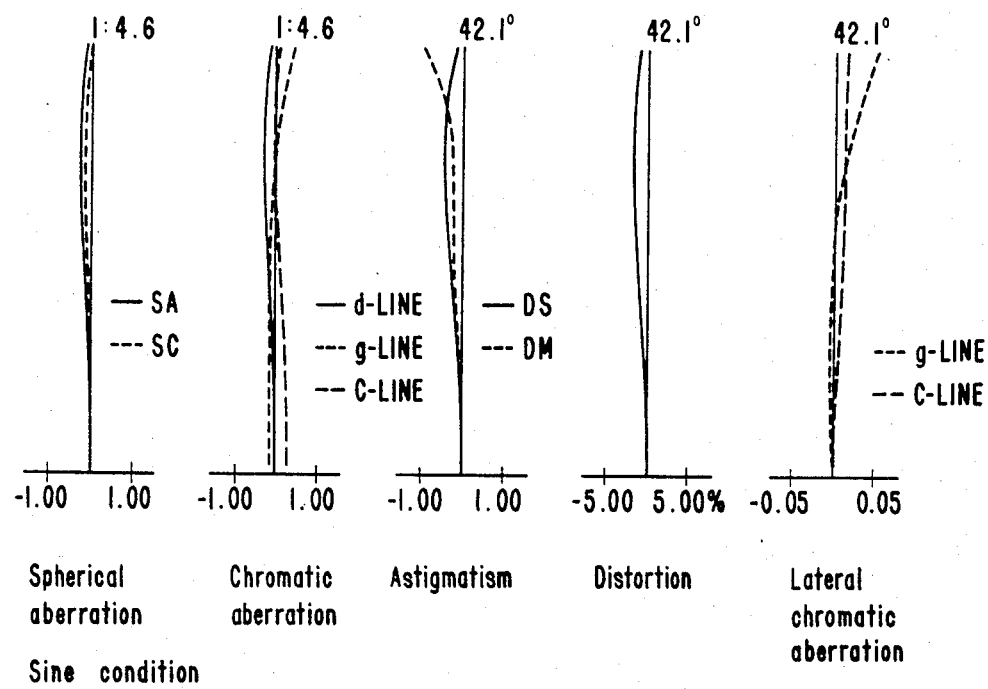
Fig. 16.

SMALL-SIZED WIDE-ANGLE LENS

FIELD OF THE INVENTION

The present invention relates to a retro-focus type wide-angle lens.

BACKGROUND OF THE INVENTION

Conventional wide-angle lenses of this kind, i.e., those having large back foci, have not been able to simultaneously satisfy two requirements, i.e., sufficient amount of corner illumination and small sizes of front lens elements. Also, they have not been sufficiently corrected for curvature of field and for chromatic aberration or magnification. This can often be the main cause of a reduction in the contrast or a blur of the resultant image.

SUMMARY OF THE INVENTION

In view of the foregoing, it is the main object of the present invention to provide a wide-angle lens which has a wide angle of view of 76° to 90°, secures a sufficient amount of corner illumination, is satisfactorily corrected for aberrations, especially curvature of field, astigmatism, and chromatic aberration of magnification, and exhibits excellent characteristics over the whole angular field, although the lens comprises only a limited number of lens elements and the front lens elements have small diameters.

This object is achieved in accordance with the teachings of the present invention by a high-performance small-sized wide-angle lens comprising either five sets of lens elements including eight lens elements or five sets of lens elements including nine line elements, these sets of lenses being numbered from the object side, the first set of convergent lens comprising a positive lens, the first set of divergent lenses comprising two or three separate negative lenses, the second set of convergent lenses comprising two separate positive lenses, the second set of divergent lens comprising a cemented negative lens, the third set of convergent lens comprising a positive lens, these sets of lenses satisfying the following conditions:

$$35 < \left| \frac{\phi_{1N,2P}}{\Sigma(\phi/\nu)} \right| \quad (1)$$

$$0.45 < \frac{\phi_{2P}}{|\phi_{1N}|} < 0.85 \quad (2)$$

$$0.15 < \frac{\phi_{2Pb}}{\phi_{1P,1N,2P}} < 0.95 \quad (3)$$

$$0.75 < \frac{\phi_{3P}}{|\phi_{2N}|} < 1.60 \quad (4)$$

where $\phi_{1N,2P}$ is the composition refracting power of the first set of divergent lenses and the second set of convergent lenses; $\Sigma(\phi/\nu)$ is the sum of $\phi/\nu$ of each lens of the first set of divergent lenses and the second set of convergent lenses, where $\phi$ is the refracting power of each lens, $\nu$ is the Abbe number of each lens; $\phi_{2P}$ is the composite refracting power of the second set of convergent lenses; $\phi_{1N}$ is the composite refracting power of the first set of convergent lenses; $\phi_{2Pb}$ is the refracting power of the surface of the second set of convergent lenses which is located closest to the image side; $\phi_{1P,1N,2P}$ is the composite refracting power of the first set of convergent lens, the first set of divergent lenses, and the second set of convergent lenses; $\phi_{3P}$ is the composite refracting power of the third set of convergent lens; and $\phi_{2N}$ is the composite refracting power of the second set of divergent lens.

In another aspect of the invention, a wide-angle lens is constructed so as to satisfy the conditions (1)–(4) above, and in which the first set of divergent lenses comprises a negative lens and one or two negative meniscus lenses having stronger negative refracting powers on their image surface side, the second set of convergent lenses comprises two-double-convex lenses, and the second set of divergent lenses comprises a double-convex lens and a double-concave lens that are cemented together, and in which the sets of lenses further satisfy the following conditions:

$$0.30f < r_{1Na} < 0.7f \quad (5)$$

$$0.45f < r_{1Nb} < 0.9f \quad (6)$$

$$30 < (\nu_{1N}/M) < 60 \quad (7)$$

$$\nu_{2Pa} < 45 \quad (8)$$

$$0.14f < (1/M) < 0.25f \quad (9)$$

$$10 < \nu_{2N\square} - \nu_{2N\square} \quad (10)$$

$$n_{2N\square} < n_{2N\square} \quad (11)$$

where f is the focal length of the whole system, $r_{1Na}$ is the radius of curvature of the surface on the image side of the first set of divergent lenses other than the lens located closest to the image side, $r_{1Nb}$ is the radius of curvature of the surface on the image side of the lens of the first set of divergent lenses located closest to the image side, $\nu_{1N}$ is the composite Abbe number of the first set of divergent lenses, M is the number of lenses constituting the first set of divergent lenses, $\nu_{2Pa}$ is the Abbe number of the double-convex lens of the second set of convergent lenses which is located on the object side, l is the interval between the surface of the first set of divergent lenses on the image side and the surface of the second set of divergent lenses on the image side, $\nu_{2N\square}$ is the Abbe number of the double-convex lens in the second set of divergent lenses, $\nu_{2N\square}$ is the Abbe number of the double-concave lens in the second set of divergent lenses, $n_{2N\square}$ is the refractive index of the double-convex lens in the second set of divergent lenses, and $n_{2N\square}$ is the refractive index of the double-convex lens in the second set of divergent lenses.

In a further aspect of the invention, a wide-angle lens is constructed so as to satisfy the conditions (1)–(4) above, and in which the whole lens system is protruded, (that is, moved in a front direction for focusing) and in which the air gap between the second set of convergent lenses and the second set of divergent lenses is made short to thereby permit the wide-angle lens to be focused on closer objects. That is, aberrations change with the distance from an object that may very from infinity to zero. The changes in the aberrations are corrected by changes in the air gap between the second set of convergent lenses and the second set of divergent lenses. This further enhances the excellent properties that the novel structure exhibits.

Other objects and features of the invention will appear in the course of description that follows.

BRIEF DESCRIPTION OF THE DRAWINGS

FIGS. 1, 3, 5, 7, 9, 11, 13, and 15 are cross-sectional views of lenses of Examples 1, 2, 3, 4, 5, 6, 7, and 8, respectively;

FIGS. 2, 4, 6, 8, 10, 12, 14, and 16 are aberration curves for illustrating Examples 1, 2, 3, 4, 5, 6, 7 and 8 respectively.

DETAILED DESCRIPTION OF THE INVENTION

Figure 9:
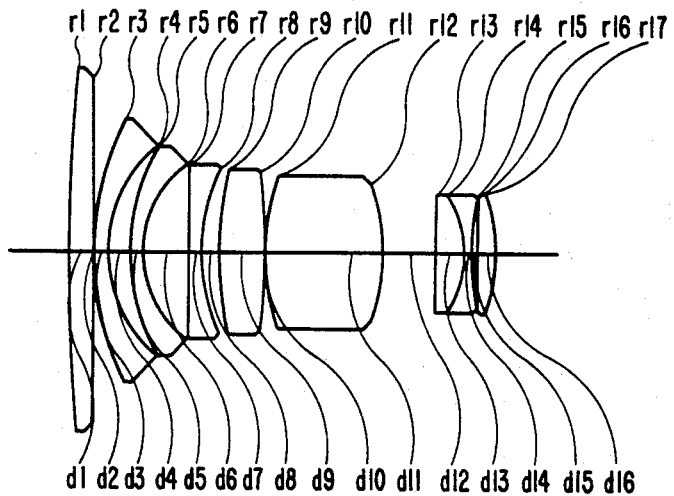
Figure 10:
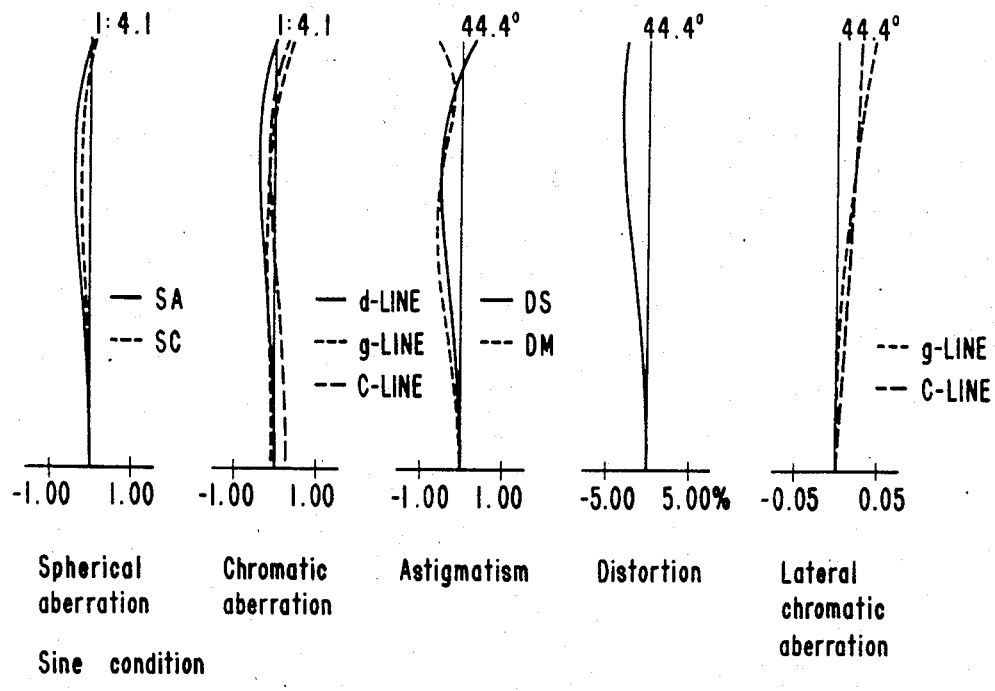
Figure 13:
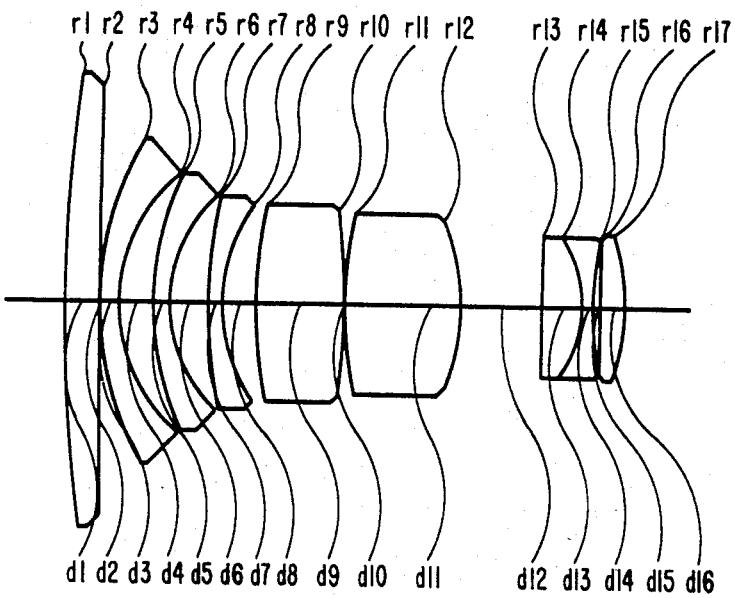
Figure 14:
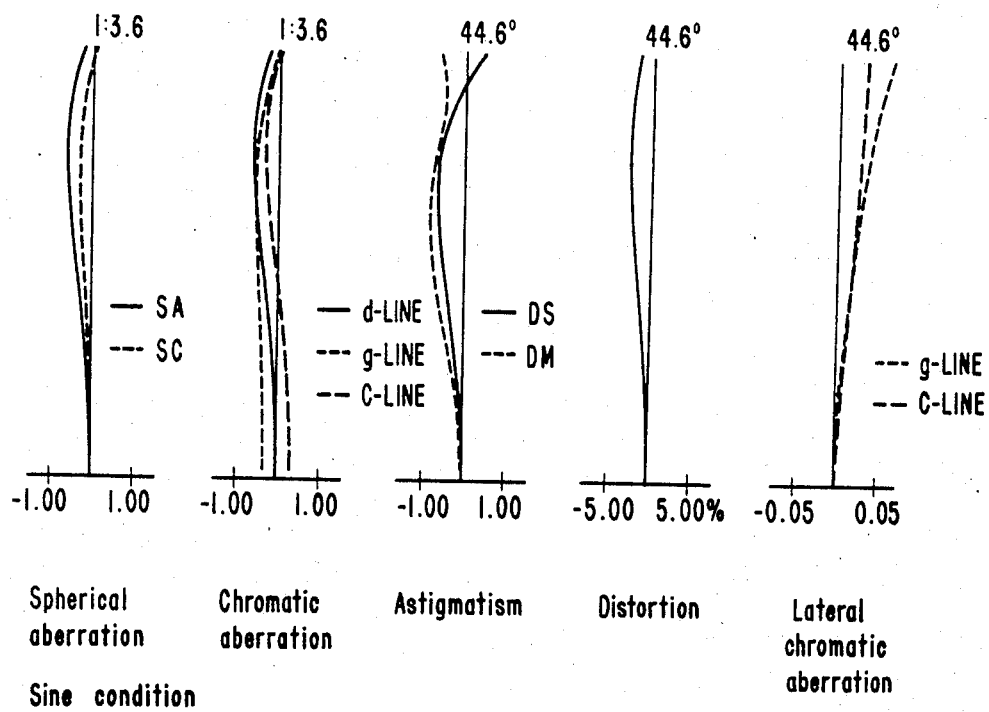

The aforementioned conditions are hereinafter described in detail.

Condition (1) is imposed because the first set of divergent lenses and the second set of convergent lenses differ in refracting power with wavelength. In the lens system according to the invention, these two sets of lenses play a central role in refracting light. The limitation of the difference between the refracting powers of the lens sets with wavelength is effective for satisfactorily correcting on-axis chromatic aberration and chromatic aberration of magnification. If condition (1) is not met, it is difficult to correct chromatic aberration while sufficiently suppressing other aberrations.

Condition (2) determines the ratio of the refracting power of the second set of the convergent lenses to the refracting power of the first set of divergent lenses. If the upper limit of condition (2) is exceeded, the positive spherical aberration produced by the first set of divergent lenses will not sufficiently correct the negative spherical aberration produced by the second set of convergent lenses. As a result, compensation at other locations will become difficult. If the lower limit of condition (2) is not reached, the second set of convergent lenses will not sufficiently correct the negative displacement of the Petzval sum and the coma produced by the second set of divergent lenses. This situation is undesirable for the corrections for curvature of field and coma.

Condition (3) is set regarding the shape of the surface of the second set of convergent lens which is located closest to the image side. If the upper limit of condition (3) is exceeded, the astigmatism produced on this surface becomes large, making compensations at other locations difficult. If the lower limit of condition (3) is exceeded (below 0.15) the first set of divergent lenses will not sufficiently correct the negative distortion. This situation is undesirable for balanced compensation between distortion and other aberrations.

Condition (4) determines the ratio of the refracting power of the third set of convergent lens to the refracting power of the second set of divergent lenses. If the upper limit of condition (4) is exceeded, the second set of divergent lenses will play an undesirably unimportant role in correcting spherical aberration and astigmatism. If the lower limit of condition (4) is exceeded (below 0.75), the negative displacement of the Petzval sum produced by the second set of divergent lenses adversely affects the correction of curvature of field to a larger extent.

Conditions (5) and (6) are effective for striking a compromise between the spherical aberration produced by the first set of divergent lenses and the positive refracting powers of the following surfaces on the image side, especially the positive power of the second set of convergent lenses.

Conditions (7) and (8) are involved in chromatic aberration. Although the lens of the second set of divergent lenses that is located on the object side is positive, the chromatic aberration found even in the first set of divergent lenses is eliminated by selecting a small value for $\nu$ so as to fulfill condition (8), which makes the dispersion relatively large. It is effective for the first set of divergent lenses to assume a moderate value of the resultant $\nu$, as required by condition (7).

Condition (9) determines the total length of the first set of divergent lenses and the distance to the front end of the second set of divergent lenses, thus enhancing the effects of conditions (5)–(8). Further, condition (9) contributes to the compactness of the lens system.

Conditions (10) and (11) are placed upon the second set of divergent lenses. The chromatic aberration which is undercorrected according to condition (8) is overcorrected according to conditions (10) and (11). Further, the Petzval sum is limited to a small value, though it is negative. This is effective for keeping the uniformity of the curvature of field. Several examples of the invention are next set forth, and in which $r_i$ is the radius of curvature of the i-th lens surface, $d_i$ is the thickness or interval of the i-th lens, n is the refractive index of each lens with respect to D line, and $\nu$ is the Abbe number of each lens.

EXAMPLE 1

| $f = 100$, $F_{NO}$ 1:4.1, angle of view $2\omega = 76.9°$ | | | |
|---|---|---|---|
| $r_i$ | $d_i$ | n | $\nu$ |
| 1  5781.808 | 7.920 | 1.51633 | 64.1 |
| 2  −544.629 | 0.354 | | |
| 3  161.965 | 4.425 | 1.74950 | 35.3 |
| 4  46.863 | 22.675 | | |
| 5  −128.013 | 3.540 | 1.51633 | 64.1 |
| 6  71.544 | 10.776 | | |
| 7  478.029 | 12.394 | 1.74950 | 35.3 |
| 8  −186.159 | 0.531 | | |
| 9  71.240 | 20.473 | 1.67790 | 55.3 |
| 10  −198.374 | 34.557 | | |
| 11  144.315 | 16.298 | 1.69680 | 55.5 |
| 12  −33.911 | 3.614 | 1.83400 | 37.2 |
| 13  86.158 | 4.571 | | |
| 14  1392.204 | 5.931 | 1.69680 | 55.5 |
| 15  −67.681 | | | |

$$\left| \frac{\phi_{1N.2P}}{\Sigma(\phi/\nu)} \right| = 56.9$$

$$\frac{\phi_{2P}}{|\phi_{1N}|} = 0.70$$

$$\frac{\phi_{2Pb}}{\phi_{1P.1N.2P}} = 0.52$$

$$\frac{\phi_{3P}}{|\phi_{2N}|} = 1.31$$

$$r_{1Na} = r_4 = 0.47f$$

$$r_{1Nb} = r_6 = 0.72f$$

$$\frac{\nu_{1N}}{M} = \frac{\nu_2 + \nu_3}{2} = 49.7$$

$$\nu_{2Pa} = \nu_4 = 35.3$$

$$\frac{l}{M} = \frac{d_3 + d_4 + d_5 + d_6}{2} = 0.21f$$

$$\nu_{2N} \square - \nu_{2N} \square = \nu_6 - \nu_7 = 18.3$$

$$n_{2N} \square = n_6 = 1.69680 < n_{2N} \square = n_7 = 1.83400$$

EXAMPLE 2

| | | f = 100, $F_{NO}$ 1:4.1, angle of view $2\omega = 77.0°$ | | |
|---|---|---|---|---|
| | $r_i$ | $d_i$ | n | $\nu$ |
| 1 | 2424.571 | 8.017 | 1.51633 | 64.1 |
| 2 | 614.107 | 0.354 | | |
| 3 | 161.699 | 4.424 | 1.80518 | 25.4 |
| 4 | 48.498 | 19.715 | | |
| 5 | 281.755 | 3.540 | 1.63854 | 55.4 |
| 6 | 66.685 | 11.875 | | |
| 7 | 91.711 | 15.928 | 1.72151 | 29.2 |
| 8 | −293.883 | 8.849 | | |
| 9 | 85.902 | 16.370 | 1.72151 | 29.2 |
| 10 | 443.562 | 10.335 | | |
| 11 | 44.764 | 13.220 | 1.51633 | 64.1 |
| 12 | −98.593 | 5.380 | 1.80518 | 25.4 |
| 13 | 40.207 | 8.513 | | |
| 14 | 1946.735 | 6.849 | 1.62041 | 60.3 |
| 15 | −64.010 | | | |

$\left| \dfrac{\phi_{1N, 2P}}{\Sigma(\phi/\nu)} \right| = 358.0$ $\dfrac{\phi_{2P}}{|\phi_{1N}|} = 0.70$ $\dfrac{\phi_{2Pb}}{\phi_{1P, 1N, 2P}} = 0.20$ $\dfrac{\phi_{3P}}{|\phi_{2N}|} = 1.17$ $r_{1Na} = r_4 = 0.48f$ $r_{1Nb} = r_6 = 0.67f$ $\dfrac{\nu_{1N}}{M} = \dfrac{\nu_2 + \nu_3}{2} = 40.4$ $\nu_{2Pa} = \nu_4 = 29.2$ $\dfrac{1}{M} = \dfrac{d_3 + d_4 + d_5 + d_6}{2} = 0.20f$ $\nu_{2N}\text{凸} - \nu_{2N}\text{凹} = \nu_6 - \nu_7 = 38.7$ $n_{2N}\text{凸} = n_6 = 1.51633 < n_{2N}\text{凹} = n_7 = 1.80518$

EXAMPLE 3

| | | f = 100, $F_{NO}$ 1:4.1, angle of view $2\omega = 76.8°$ | | |
|---|---|---|---|---|
| | $r_i$ | $d_i$ | n | $\nu$ |
| 1 | 2661.090 | 8.142 | 1.51633 | 64.1 |
| 2 | −581.075 | 0.354 | | |
| 3 | 138.923 | 4.425 | 1.67003 | 47.3 |
| 4 | 44.532 | 22.213 | | |
| 5 | −132.516 | 3.540 | 1.62004 | 36.3 |
| 6 | 74.338 | 12.761 | | |
| 7 | 983.662 | 9.452 | 1.71736 | 29.5 |
| 8 | −143.762 | 0.531 | | |
| 9 | 71.417 | 21.062 | 1.65844 | 50.9 |
| 10 | −181.489 | 37.540 | | |
| 11 | 143.829 | 9.982 | 1.69680 | 55.5 |
| 12 | −34.956 | 5.381 | 1.83400 | 37.2 |
| 13 | 89.384 | 4.425 | | |
| 14 | ∞ | 5.823 | 1.69680 | 55.5 |
| 15 | −65.134 | | | |

$\left| \dfrac{\phi_{1N, 2P}}{\Sigma(\phi/\nu)} \right| = 42.6$ $\dfrac{\phi_{2P}}{|\phi_{1N}|} = 0.68$ -continued $\dfrac{\phi_{2Pb}}{\phi_{1P, 1N, 2P}} = 0.59$ $\dfrac{\phi_{3P}}{|\phi_{2N}|} = 1.34$ $r_{1Na} = r_4 = 0.45f$ $r_{1Nb} = r_6 = 0.74f$ $\dfrac{\nu_{1N}}{M} = \dfrac{\nu_2 + \nu_3}{2} = 41.8$ $\nu_{2Pa} = \nu_4 = 29.5$ $\dfrac{1}{M} = \dfrac{d_3 + d_4 + d_5 + d_6}{2} = 0.21f$ $\nu_{2N}\text{凸} - \nu_{2N}\text{凹} = \nu_6 - \nu_7 = 18.3$ $n_{2N}\text{凸} = n_6 = 1.69680 < n_{2N}\text{凹} = n_7 = 1.83400$

EXAMPLE 4

| | | f = 100, $F_{NO}$ 1:4.1, $2\omega = 88.5°$ | | |
|---|---|---|---|---|
| | $r_i$ | $d_i$ | n | $\nu$ |
| 1 | 692.817 | 9.686 | 1.51633 | 64.1 |
| 2 | −9937.903 | 0.432 | | |
| 3 | 109.381 | 5.394 | 1.83400 | 37.2 |
| 4 | 48.797 | 13.610 | | |
| 5 | 95.592 | 4.315 | 1.51823 | 59.0 |
| 6 | 45.047 | 16.851 | | |
| 7 | −1945.009 | 4.315 | 1.51633 | 64.1 |
| 8 | 72.837 | 8.095 | | |
| 9 | 172.095 | 17.261 | 1.68893 | 31.1 |
| 10 | −231.701 | 0.647 | | |
| 11 | 86.612 | 46.717 | 1.51633 | 64.1 |
| 12 | −76.792 | 20.014 | | |
| 13 | 885.867 | 15.559 | 1.69680 | 55.5 |
| 14 | −38.309 | 3.236 | 1.83400 | 37.2 |
| 15 | 114.318 | 2.035 | | |
| 16 | −3540.812 | 6.551 | 1.69680 | 55.5 |
| 17 | −68.710 | | | |

$\left| \dfrac{\phi_{1N, 2P}}{\Sigma(\phi/\nu)} \right| = 163.5$ $\dfrac{\phi_{2P}}{|\phi_{1N}|} = 0.62$ $\dfrac{\phi_{2Pb}}{\phi_{1P, 1N, 2P}} = 0.69$ $\dfrac{\phi_{3P}}{|\phi_{2N}|} = 0.99$ $r_{1Na} = r_4 = 0.49f$ and $r_{1Na} = r_6 = 0.45f$ $r_{1Nb} = r_8 = 0.73f$ $\dfrac{\nu_{1N}}{M} = \dfrac{\nu_2 + \nu_3 + \nu_4}{3} = 53.4$ $\nu_{2Pa} = \nu_5 = 31.1$ $\dfrac{1}{M} = \dfrac{d_3 + d_4 + d_5 + d_6 + d_7 + d_8}{3} = 0.18f$ $\nu_{2N}\text{凸} - \nu_{2N}\text{凹} = \nu_7 - \nu_8 = 18.3$ $n_{2N}\text{凸} = n_7 = 1.69680 < n_{2N}\text{凹} = n_8 = 1.83400$

EXAMPLE 5

| | $r_i$ | $d_i$ | n | ν |
|---|---|---|---|---|
| | f = 100, $F_{NO}$ 1:4.1, 2ω = 88.8° | | | |
| 1 | 686.459 | 9.352 | 1.51633 | 64.1 |
| 2 | 7573.795 | 0.431 | | |
| 3 | 101.154 | 5.394 | 1.83400 | 37.2 |
| 4 | 48.453 | 8.464 | | |
| 5 | 70.767 | 4.746 | 1.63854 | 55.4 |
| 6 | 38.676 | 17.393 | | |
| 7 | −4507.249 | 4.315 | 1.56883 | 56.3 |
| 8 | 63.549 | 6.595 | | |
| 9 | 120.137 | 17.259 | 1.68893 | 31.1 |
| 10 | 243.899 | 0.647 | | |
| 11 | 92.382 | 43.504 | 1.51633 | 64.1 |
| 12 | 65.531 | 19.570 | | |
| 13 | 747.212 | 10.742 | 1.71300 | 53.8 |
| 14 | −36.074 | 3.236 | 1.83400 | 37.2 |
| 15 | 109.879 | 2.242 | | |
| 16 | −790.431 | 6.362 | 1.71300 | 53.8 |
| 17 | −67.993 | | | |

$\left|\frac{\phi_{1N, 2P}}{\Sigma(\phi/\nu)}\right| = 175.3$ $\frac{\phi_{2P}}{|\phi_{1N}|} = 0.62$ $\frac{\phi_{2Pb}}{\phi_{1P, 1N, 2P}} = 0.77, \quad \frac{\phi_{3P}}{|\phi_{2N}|} = 0.97$ $r_{1Na} = r_4 = 0.48f$ and $r_{1Na} = r_6 = 0.39f$ $r_{1Nb} = r_8 = 0.64f$ $\frac{\nu_{1N}}{M} = \frac{\nu_2 + \nu_3 + \nu_4}{3} = 50.0$ $\nu_{2Pa} = \nu_5 = 31.1$ $\frac{1}{M} = \frac{d_3 + d_4 + d_5 + d_6 + d_7 + d_8}{3} = 0.16f$ $\nu_{2N\triangle} - \nu_{2N\square} = \nu_7 - \nu_8 = 16.6$ $n_{2N\triangle} = n_7 = 1.71300 < n_{2N\square} = n_8 = 1.83400$

EXAMPLE 6

| | $r_i$ | $d_i$ | n | ν |
|---|---|---|---|---|
| | f = 100, $F_{NO}$ 1:4.1, angle of view 2ω = 88.2° | | | |
| 1 | 603.962 | 9.620 | 1.51633 | 64.1 |
| 2 | 6980.549 | 0.431 | | |
| 3 | 124.651 | 5.393 | 1.83400 | 37.2 |
| 4 | 52.228 | 10.828 | | |
| 5 | 102.958 | 4.745 | 1.69680 | 55.5 |
| 6 | 49.253 | 11.842 | | |
| 7 | 221.177 | 4.314 | 1.69680 | 55.5 |
| 8 | 62.620 | 8.412 | | |
| 9 | 129.420 | 26.315 | 1.68893 | 31.1 |
| 10 | −273.215 | 0.647 | | |
| 11 | 93.763 | 37.704 | 1.51633 | 64.1 |
| 12 | −76.867 | 25.043 | | |
| 13 | 232.849 | 15.832 | 1.71300 | 53.8 |
| 14 | −37.875 | 3.236 | 1.83400 | 37.2 |
| 15 | 100.301 | 2.804 | | |
| 16 | −330.003 | 7.593 | 1.71300 | 53.8 |
| 17 | −65.832 | | | |

$\left|\frac{\phi_{1N, 2P}}{\Sigma(\phi/\nu)}\right| = 98.3$ $\frac{\phi_{2P}}{|\phi_{1N}|} = 0.60$ $\frac{\phi_{2Pb}}{\phi_{1P, 1N, 2P}} = 0.76$ $\frac{\phi_{3P}}{|\phi_{2N}|} = 1.08$ $r_{1Na} = r_4 = 0.52f$ and $r_{1Na} = r_6 = 0.49f$ $r_{1Nb} = r_8 = 0.63f$ $\frac{\nu_{1N}}{M} = \frac{\nu_2 + \nu_3 + \nu_4}{3} = 49.4$ $\nu_{2Pa} = \nu_5 = 31.1$ $\frac{1}{M} = \frac{d_3 + d_4 + d_5 + d_6 + d_7 + d_8}{3} = 0.15f$ $\nu_{2N\triangle} - \nu_{2N\square} = \nu_7 - \nu_8 = 16.6$ $n_{2N\triangle} = n_7 = 1.71300 < n_{2N\square} = n_8 = 1.83400$

EXAMPLE 7

| | $r_i$ | $d_i$ | n | ν |
|---|---|---|---|---|
| | f = 100, $F_{NO}$ 1:3.6, angle of view 2ω = 89.1° | | | |
| 1 | 562.493 | 13.055 | 1.51633 | 64.1 |
| 2 | 4109.489 | 0.556 | | |
| 3 | 117.132 | 6.944 | 1.83400 | 37.2 |
| 4 | 59.721 | 12.639 | | |
| 5 | 105.499 | 6.111 | 1.69680 | 55.5 |
| 6 | 51.399 | 14.389 | | |
| 7 | 181.228 | 5.555 | 1.69680 | 55.5 |
| 8 | 59.444 | 12.278 | | |
| 9 | 158.331 | 32.777 | 1.68893 | 31.1 |
| 10 | −315.879 | 0.833 | | |
| 11 | 136.493 | 43.000 | 1.51633 | 64.1 |
| 12 | −77.146 | 30.417 | | |
| 13 | 1333.316 | 15.278 | 1.71300 | 53.8 |
| 14 | −42.833 | 4.167 | 1.83400 | 37.2 |
| 15 | 129.104 | 2.361 | | |
| 16 | 1291.239 | 9.500 | 1.71300 | 53.8 |
| 17 | −78.777 | | | |

$\left|\frac{\phi_{1N, 2P}}{\Sigma(\phi/\nu)}\right| = 107.7$ $\frac{\phi_{2P}}{|\phi_{1N}|} = 0.59$ $\frac{\phi_{2Pb}}{\phi_{1P, 1N, 2P}} = 0.82$ $\frac{\phi_{3P}}{|\phi_{2N}|} = 1.10$ $r_{1Na} = r_4 = 0.60f$ and $r_{1Na} = r_6 = 0.51f$ $r_{1Nb} = r_8 = 0.59f$ $\frac{\nu_{1N}}{M} = \frac{\nu_2 + \nu_3 + \nu_4}{3} = 49.4$ $\nu_{2Pa} = \nu_5 = 31.1$ $\frac{1}{M} = \frac{d_3 + d_4 + d_5 + d_6 + d_7 + d_8}{3} = 0.19f$ $\nu_{2N\triangle} - \nu_{2N\square} = \nu_7 - \nu_8 = 16.6$ $n_{2N\triangle} = n_7 = 1.71300 < n_{2N\square} = n_8 = 1.83400$

EXAMPLE 8

| | f 100, F$_{NO}$ 1:4.6, angle of view 2ω 84.2° | | | |
|---|---|---|---|---|
| | r$_i$ | d$_i$ | n | ν |
| 1 | 359.349 | 6.410 | 1.51633 | 64.1 |
| 2 | 1270.843 | 0.251 | | |
| 3 | 90.157 | 3.902 | 1.83400 | 37.2 |
| 4 | 40.284 | 7.316 | | |
| 5 | 59.640 | 3.902 | 1.63854 | 55.4 |
| 6 | 37.589 | 15.607 | | |
| 7 | −179.126 | 3.623 | 1.56883 | 56.3 |
| 8 | 79.220 | 4.403 | | |
| 9 | 168.052 | 11.162 | 1.68893 | 31.1 |
| 10 | −128.617 | 0.251 | | |
| 11 | 82.431 | 46.180 | 1.51633 | 64.1 |
| 12 | −60.337 | 19.439 | | |
| 13 | 425.008 | 31.1 | 1.71300 | 53.8 |
| 14 | −35.185 | 9.755 | 1.83400 | 37.2 |
| 15 | 106.297 | 2.439 | | |
| 16 | −290.343 | 4.515 | 1.71300 | 53.8 |
| 17 | −61.313 | | | |

$$\left| \frac{\phi_{1N,2P}}{\Sigma(\phi/\nu)} \right| = 124.1$$

$$\frac{\phi_{2P}}{|\phi_{1N}|} = 0.62$$

$$\frac{\phi_{2Pb}}{\phi_{1P,1N,2P}} = 0.83$$

$$\frac{\phi_{3P}}{|\phi_{2N}|} = 0.97$$

$r_{1Na} = r_4 = 0.40f$ and $r_{1Na} = r_6 = 0.38f$ $r_{1Nb} = r_8 = 0.79f$ $$\frac{\nu_{1N}}{M} = \frac{\nu_2 + \nu_3 + \nu_4}{3} = 49.6$$

$\nu_{2Pa} = \nu_5 = 31.3$ $$\frac{l}{M} = \frac{d_3 + d_4 + d_5 + d_6 + d_7 + d_8}{3} = 0.13f$$

$\nu_{2N}\text{凸} - \nu_{2N}\text{凹} = \nu_7 - \nu_8 = 16.6$ $n_{2N}\text{凸} = n_7 = 1.71300 < n_{2N}\text{凹} = n_8 = 1.83400$ As thus far described, the novel wide-angle lens according to the invention secures a sufficient amount of corner illumination, satisfactorily corrects various abberations, and exhibits good properties over the whole angular field, although it comprises a limited number of lens elements and the front lenses have small diameters.

What is claimed is:

1. A high-performance small-sized wide-angle lens comprising five sets of lens elements including eight lens elements, these sets of lenses being numbered from the object side, the first set of convergent lens comprising a positive lens, the first set of divergent lenses comprising two separate negative lenses, the second set of convergent lenses comprising two separate positive lenses, the second set of divergent lens comprising a cemented negative lens, the third set of convergent lens comprising a positive lens, these sets of lenses satisfying the following conditions:

$$35 < \left| \frac{\phi_{1N,2P}}{\Sigma(\phi/\nu)} \right| \quad (1)$$

$$0.45 < \frac{\phi_{2P}}{|\phi_{1N}|} < 0.85 \quad (2)$$

$$0.15 < \frac{\phi_{2Pb}}{\phi_{1P,1N,2P}} < 0.95 \quad (3)$$

$$0.75 < \frac{\phi_{3P}}{|\phi_{2N}|} < 1.60 \quad (4)$$

where $\phi_{1N,2P}$ is the composite refracting power of the first set of divergent lenses and the second set of convergent lenses; $\Sigma(\phi/\nu)$ is the sum of $\phi/\nu$ of each lens of the first set of divergent lenses and the second set of convergent lenses, where $\phi$ is the refracting power of each lens, $\nu$ is the Abbe number of each lens; $\phi_{2P}$ is the composite refracting power of the second set of convergent lenses; $\phi_{1N}$ is the composite refracting power of the first set of convergent lenses; $\phi_{2Pb}$ is the refracting power of the surface of the second set of convergent lenses which is located closest to the image side; $\phi_{1P,1N,2P}$ is the composite refracting power of the first set of convergent lens, the first set of divergent lenses, and the second set of convergent lenses; $\phi_{3P}$ is the composite refracting power of the third set of convergent lens; and $\phi_{2N}$ is the composite refracting power of the second set of divergent lens.

2. A wide-angle lens as set forth in claim 1 wherein the first set of divergent lenses comprises a negative lens and a negative meniscus lens having stronger negative refracting powers on their image surface side, the second set of convergent lenses comprises two double-convex lenses, and the second set of divergent lenses comprises a double-convex lens and a double-concave lens that are cemented together, and wherein the sets of lenses further satisfy the following conditions:

$$0.30f < r_{1Na} < 0.7f \quad (5)$$

$$0.45f < r_{1Nb} < 0.9f \quad (6)$$

$$30 < \nu_{1N}/M < 60 \quad (7)$$

$$\nu_{2Pa} < 45 \quad (8)$$

$$0.14f < l/M < 0.25f \quad (9)$$

$$10 < \nu_{2N}\text{凸} - \nu_{2N}\text{凹} \quad (10)$$

$$n_{2N}\text{凸} < n_{2N}\text{凹} \quad (11)$$

where f is the focal length of the whole system, $r_{1Na}$ is the radius of curvature of the surface on the image side of the first set of divergent lenses other than the lens located closest to the image side, $r_{1Nb}$ is the radius of curvature of the surface on the image side of the lens of the first set of divergent lenses located closest to the image side, $\nu_{1N}$ is the composite Abbe number of the first set of divergent lenses, M is the number of lenses constituting the first set of divergent lenses, $\nu_{2Pa}$ is the Abbe number of the double-convex lens of the second set of divergent lenses which is located on the object side, l is the interval between the surface of the first set of divergent lenses on the image side and the surface of the second set of divergent lenses on the image side, $\nu_{2N}\text{凸}$ is the Abbe number of the double-convex lens in the second set of divergent lenses, $\nu_{2N}\text{凹}$ is the Abbe number of the double-concave lens in the second set of divergent lenses, $n_{2N}\text{凸}$ is the refractive index of the double-convex lens in the second set of divergent lenses, and $n_{2N[+]}$ is the refractive index of the double-convex lens in the second set of divergent lenses.

3. A wide-angle lens as set forth in claim 1, wherein the whole lens system is protruded, and wherein the air gap between the second set of convergent lenses and the second set of divergent lenses is made short to thereby permit the wide-angle lens to be focused on closer objects.

4. A wide-angle lens according to claim 1 having the following numerical data:

| | f = 100, $F_{NO}$ 1:4.1, angle of view $2\omega = 76.9°$ | | | |
|---|---|---|---|---|
| | $r_i$ | $d_i$ | n | $\nu$ |
| 1 | 5781.808 | 7.920 | 1.51633 | 64.1 |
| 2 | 544.629 | 0.354 | | |
| 3 | 161.965 | 4.425 | 1.74950 | 35.3 |
| 4 | 46.863 | 22.675 | | |
| 5 | −128.013 | 3.540 | 1.51633 | 64.1 |
| 6 | 71.544 | 10.776 | | |
| 7 | 478.029 | 12.394 | 1.74950 | 35.3 |
| 8 | 186.159 | 0.531 | | |
| 9 | 71.240 | 20.473 | 1.67790 | 55.3 |
| 10 | 198.374 | 34.557 | | |
| 11 | 144.315 | 16.298 | 1.69680 | 55.5 |
| 12 | 33.911 | 3.614 | 1.83400 | 37.2 |
| 13 | 86.158 | 4.571 | | |
| 14 | 1392.204 | 5.931 | 1.69680 | 55.5 |
| 15 | −67.681 | | | |

$\left| \dfrac{\phi_{1N,2P}}{\Sigma(\phi/\nu)} \right| = 56.9$ $\dfrac{\phi_{2P}}{|\phi_{1N}|} = 0.70$ $\dfrac{\phi_{2Pb}}{\phi_{1P,1N,2P}} = 0.52$ $\dfrac{\phi_{3P}}{|\phi_{2N}|} = 1.31$ $r_{1Na} = r_4 = 0.47f$ $r_{1Nb} = r_6 = 0.72f$ $\dfrac{\nu_{1N}}{M} = \dfrac{\nu_2 + \nu_3}{2} = 49.7$ $\nu_{2Pa} = \nu_4 = 35.3$ $\dfrac{1}{M} = \dfrac{d_3 + d_4 + d_5 + d_6}{2} = 0.21f$ $\nu_{2N[+]} - \nu_{2N[-]} = \nu_6 - \nu_7 = 18.3$ $n_{2N[+]} = n_6 = 1.69680 < n_{2N[-]} = n_7 = 1.83400$ 5. A wide-angle lens according to claim 1 having the following numerical data:

| | f = 100, $F_{NO}$ 1:4.1, angle of view $2\omega = 77.0°$ | | | |
|---|---|---|---|---|
| | $r_i$ | $d_i$ | n | $\nu$ |
| 1 | 2424.571 | 8.017 | 1.51633 | 64.1 |
| 2 | −614.107 | 0.354 | | |
| 3 | 161.699 | 4.424 | 1.80518 | 25.4 |
| 4 | 48.498 | 19.715 | | |
| 5 | −281.755 | 3.540 | 1.63854 | 55.4 |
| 6 | 66.685 | 11.875 | | |
| 7 | 91.711 | 15.928 | 1.72151 | 29.2 |
| 8 | −293.883 | 8.849 | | |
| 9 | 85.902 | 16.370 | 1.72151 | 29.2 |
| 10 | −443.562 | 10.335 | | |
| 11 | 44.764 | 13.220 | 1.51633 | 64.1 |
| 12 | −98.593 | 5.380 | 1.80518 | 25.4 |
| 13 | 40.207 | 8.513 | | |
| 14 | 1946.735 | 6.849 | 1.62041 | 60.3 |
| 15 | 64.010 | | | |

$\left| \dfrac{\phi_{1N,2P}}{\Sigma(\phi/\nu)} \right| = 358.0$ $\dfrac{\phi_{2P}}{|\phi_{1N}|} = 0.70$ $\dfrac{\phi_{2Pb}}{\phi_{1P,1N,2P}} = 0.20$ $\dfrac{\phi_{3P}}{|\phi_{2N}|} = 1.17$ $r_{1Na} = r_4 = 0.48f$ $r_{1Nb} = r_6 = 0.67f$ $\dfrac{\nu_{1N}}{M} = \dfrac{\nu_2 + \nu_3}{2} = 40.4$ $\nu_{2Pa} = \nu_4 = 29.2$ $\dfrac{1}{M} = \dfrac{d_3 + d_4 + d_5 + d_6}{2} = 0.20f$ $\nu_{2N[+]} - \nu_{2N[-]} = \nu_6 - \nu_7 = 38.7$ $n_{2N[+]} = n_6 = 1.51633 < n_{2N[-]} = n_7 = 1.80518$ 6. A wide angle lens according to claim 1 having the following numerical data:

| | f = 100, $F_{NO}$ 1:4.1, angle of view $2\omega = 76.8°$ | | | |
|---|---|---|---|---|
| | $r_i$ | $d_i$ | n | $\nu$ |
| 1 | 2661.090 | 8.142 | 1.51633 | 64.1 |
| 2 | −581.075 | 0.354 | | |
| 3 | 138.923 | 4.425 | 1.67003 | 47.3 |
| 4 | 44.532 | 22.213 | | |
| 5 | −132.516 | 3.540 | 1.62004 | 36.3 |
| 6 | 74.338 | 12.761 | | |
| 7 | 983.662 | 9.452 | 1.71736 | 29.5 |
| 8 | −143.762 | 0.531 | | |
| 9 | 71.417 | 21.062 | 1.65844 | 50.9 |
| 10 | −181.489 | 37.540 | | |
| 11 | 143.829 | 9.982 | 1.69680 | 55.5 |
| 12 | −34.956 | 5.381 | 1.83400 | 37.2 |
| 13 | 89.384 | 4.425 | | |
| 14 | ∞ | 5.823 | 1.69680 | 55.5 |
| 15 | −65.134 | | | |

$\left| \dfrac{\phi_{1N,2P}}{\Sigma(\phi/\nu)} \right| = 42.6$ $\dfrac{\phi_{2P}}{|\phi_{1N}|} = 0.68$ $\dfrac{\phi_{2Pb}}{\phi_{1P,1N,2P}} = 0.59$ $\dfrac{\phi_{3P}}{|\phi_{2N}|} = 1.34$ $r_{1Na} = r_4 = 0.45f$ $r_{1Nb} = r_6 = 0.74f$ $\dfrac{\nu_{1N}}{M} = \dfrac{\nu_2 + \nu_3}{2} = 41.8$ $\nu_{2Pa} = \nu_4 = 29.5$ -continued

| $\frac{1}{M}$ | $\frac{d_3 + d_4 + d_5 + d_6}{2}$ | 0.21f |

| $\nu_{2Nc\bar{b}}$ | $\nu_{2N[c]}$ | $\nu_6$ | $\nu_7$ | 18.3 |
| $n_{2N\bar{c}\bar{b}}$ | $n_6$ | 1.69680 | $n_{2N[c]}$ | $n_7$ | 1.83400 |

7. A high-performance small-sized wide-angle lens comprising five sets of lens elements including nine lens elements, these sets of lenses being numbered from the object side, the first set of convergent lens comprising a positive lens, the first set of divergent lenses comprising three separate negative lenses, the second set of convergent lenses comprising two separate positive lenses, the second set of divergent lens comprising a cemented negative lens, the third set of convergent lens comprising a positive lens, these sets of lenses satisfying the following conditions:

$$35 < \left| \frac{\phi_{1N,2P}}{\Sigma(\phi/\nu)} \right| \quad (1)$$

$$0.45 < \frac{\phi_{2P}}{|\phi_{1N}|} < 0.85 \quad (2)$$

$$0.15 < \frac{\phi_{2Pb}}{\phi_{1P,1N,2P}} < 0.95 \quad (3)$$

$$0.75 < \frac{\phi_{3P}}{|\phi_{2N}|} < 1.60 \quad (4)$$

where $\phi_{1N,2P}$ is the composite refracting power of the first set of divergent lenses and the second set of convergent lenses; $\Sigma(\phi/\nu)$ is the sum of $\phi/\nu$ of each lens of the first set of divergent lenses and the second set of convergent lenses, where $\phi$ is the refracting power of each lens, $\nu$ is the Abbe number of each lens; $\phi_{2P}$ is the composite refracting power of the second set of convergent lenses; $\phi_{1N}$ is the composite refracting power of the first set of convergent lenses; $\phi_{2Pb}$ is the refracting power of the surface of the second set of convergent lenses which is located closest to the image side; $\phi_{1P,1N,2P}$ is the composite refracting power of the first set of convergent lenses, the first set of divergent lenses, and the second set of convergent lenses; $\phi_{3P}$ is the composite refracting power of the third set of convergent lens; and $\phi_{2N}$ is the composite refracting power of the second set of divergent lens.

8. A wide-angle lens as set forth in claim 7, wherein the first set of divergent lenses comprises a negative lens and two negative meniscus lenses having stronger negative refracting powers on their image surface side, the second set of convergent lenses comprises two double-convex lenses, and the second set of divergent lenses comprises a double-convex lens and a double-concave lens that are cemented together, and wherein the sets of lenses further satisfy the following conditions:

$$0.30f < r_{1Na} < 0.7f \quad (5)$$

$$0.45f < r_{1Nb} < 0.9f \quad (6)$$

$$30 < \nu_{1N}/M < 60 \quad (7)$$

$$\nu_{2Pa} < 45 \quad (8)$$

$$0.14f < l/M < 0.25f \quad (9)$$

$$10 < \nu_{2N\bar{c}\bar{b}} - \nu_{2N[c]} \quad (10)$$

$$n_{2N\bar{c}\bar{b}} - n_{2N[c]} \quad (11)$$

where f is the focal length of the whole system, $r_{1Na}$ is the radius of curvature of the surface on the image side of the first set of divergent lenses other than the lens located closest to the image side, $r_{1Nb}$ is the radius of curvature of the surface on the image side of the lens of the first set of divergent lenses located closest to the image side, $\nu_{1N}$ is the composite Abbe number of the first set of divergent lenses, M is the number of lenses constituting the first set of divergent lenses, $\nu_{2Pa}$ is the Abbe number of the double-convex lens of the second set of divergent lenses which is located on the object side, l is the interval between the surface of the first set of divergent lenses on the image side and the surface of the second set of divergent lenses on the image side, $\nu_{2N\bar{c}\bar{b}}$ is the Abbe number of the double-convex lens in the second set of divergent lenses, $\nu_{2N[c]}$ is the Abbe number of the double-concave lens in the second set of divergent lenses, $n_{2N\bar{c}\bar{b}}$ is the refractive index of the double-convex lens in the second set of divergent lenses, and $n_{2N[c]}$ is the refractive index of the double-convex lens in the second set of divergent lenses.

9. A wide-angle lens as set forth in claim 7 wherein the whole lens system is protruded, and wherein the air gap between the second set of convergent lenses and the second set of divergent lenses is made short to thereby permit the wide-angle lens to be focused on closer objects.

10. A wide-angle lens according to claim 7 having the following numerical data:

| f = 100, $F_{NO}$ 1:4.1, 2ω = 88.5° | | | |
|---|---|---|---|
| $r_i$ | $d_i$ | n | ν |
| 1 | 692.817 | 9.686 | 1.51633 | 64.1 |
| 2 | −9937.903 | 0.432 | | |
| 3 | 109.381 | 5.394 | 1.83400 | 37.2 |
| 4 | 48.797 | 13.610 | | |
| 5 | 95.592 | 4.315 | 1.51823 | 59.0 |
| 6 | 45.047 | 16.851 | | |
| 7 | −1945.009 | 4.315 | 1.51633 | 64.1 |
| 8 | 72.837 | 8.095 | | |
| 9 | 172.095 | 17.261 | 1.68893 | 31.1 |
| 10 | −231.701 | 0.647 | | |
| 11 | 86.612 | 46.717 | 1.51633 | 64.1 |
| 12 | −76.792 | 20.014 | | |
| 13 | 885.867 | 15.559 | 1.69680 | 55.5 |
| 14 | −38.309 | 3.236 | 1.83400 | 37.2 |
| 15 | 114.318 | 2.035 | | |
| 16 | −3540.812 | 6.551 | 1.69680 | 55.5 |
| 17 | −68.710 | | | |

$$\left| \frac{\phi_{1N,2P}}{\Sigma(\phi/\nu)} \right| = 163.5$$

$$\frac{\phi_{2P}}{|\phi_{1N}|} = 0.62$$

$$\frac{\phi_{2Pb}}{\phi_{1P,1N,2P}} = 0.69$$

$$\frac{\phi_{3P}}{|\phi_{2N}|} = 0.99$$

$r_{1Na} = r_4 = 0.49f$ and $r_{1Na} = r_6 = 0.45f$ $r_{1Nb} = r_8 = 0.73f$ $$\frac{\nu_{1N}}{M} = \frac{\nu_2 + \nu_3 + \nu_4}{3} = 53.4$$

$v_{2Pa} = v_5 = 31.1$ $\frac{1}{M} = \frac{d_3 + d_4 + d_5 + d_6 + d_7 + d_8}{3} = 0.18f$ $v_{2N}\triangle - v_{2N}\square = v_7 - v_8 = 18.3$ $n_{2N}\triangle = n_7 = 1.69680 < n_{2N}\square = n_8 = 1.83400$

11. A wide-angle lens according to claim 7 having the following numerical data:

| | $f = 100, F_{NO} 1:4.1, 2\omega = 88.8°$ | | | |
|---|---|---|---|---|
| | $r_i$ | $d_i$ | n | $\nu$ |
| 1 | 686.459 | 9.352 | 1.51633 | 64.1 |
| 2 | −7573.795 | 0.431 | | |
| 3 | 101.154 | 5.394 | 1.83400 | 37.2 |
| 4 | 48.453 | 8.464 | | |
| 5 | 70.767 | 4.746 | 1.63854 | 55.4 |
| 6 | 38.676 | 17.393 | | |
| 7 | −4507.249 | 4.315 | 1.56883 | 56.3 |
| 8 | 63.549 | 6.595 | | |
| 9 | 120.137 | 17.259 | 1.68893 | 31.1 |
| 10 | −243.899 | 0.647 | | |
| 11 | 92.382 | 43.504 | 1.51633 | 64.1 |
| 12 | −65.531 | 19.570 | | |
| 13 | 747.212 | 10.742 | 1.71300 | 53.8 |
| 14 | −36.074 | 3.236 | 1.83400 | 37.2 |
| 15 | 109.879 | 2.242 | | |
| 16 | −790.431 | 6.362 | 1.71300 | 53.8 |
| 17 | −67.993 | | | |

$\left|\frac{\phi_{1N,2P}}{\Sigma(\phi/\nu)}\right| = 175.3$ $\frac{\phi_{2P}}{|\phi_{1N}|} = 0.62$ $\frac{\phi_{2Pb}}{\phi_{1P,1N,2P}} = 0.77, \quad \frac{\phi_{3P}}{|\phi_{2N}|} = 0.97$ $r_{1Na} = r_4 = 0.48f$ and $r_{1Na} = r_6 = 0.39f$ $r_{1Nb} = r_8 = 0.64f$ $\frac{\nu_{1N}}{M} = \frac{\nu_2 + \nu_3 + \nu_4}{3} = 50.0$ $v_{2Pa} = v_5 = 31.1$ $\frac{1}{M} = \frac{d_3 + d_4 + d_5 + d_6 + d_7 + d_8}{3} = 0.16f$ $v_{2N}\triangle - v_{2N}\square = v_7 - v_8 = 16.6$ $n_{2N}\triangle = n_7 = 1.71300 < n_{2N}\square = n_8 = 1.83400$

12. A wide-angle lens according to claim 7 having the following numerical data:

| | $f = 100, F_{NO} 1:4.1$, angle of view $2\omega = 88.2°$ | | | |
|---|---|---|---|---|
| | $r_i$ | $d_i$ | n | $\nu$ |
| 1 | 603.962 | 9.620 | 1.51633 | 64.1 |
| 2 | 6980.549 | 0.431 | | |
| 3 | 124.651 | 5.393 | 1.83400 | 37.2 |
| 4 | 52.228 | 10.828 | | |
| 5 | 102.958 | 4.745 | 1.69680 | 55.5 |
| 6 | 49.253 | 11.842 | | |
| 7 | 221.177 | 4.314 | 1.69680 | 55.5 |
| 8 | 62.620 | 8.412 | | |
| 9 | 129.420 | 26.315 | 1.68893 | 31.1 |
| 10 | −273.215 | 0.647 | | |
| 11 | 93.763 | 37.704 | 1.51633 | 64.1 |
| 12 | 76.867 | 25.043 | | |
| 13 | 232.849 | 15.832 | 1.71300 | 53.8 |
| 14 | 37.875 | 3.236 | 1.83400 | 37.2 |
| 15 | 100.301 | 2.804 | | |
| 16 | 330.003 | 7.593 | 1.71300 | 53.8 |
| 17 | 65.832 | | | |

$\left|\frac{\phi_{1N,2P}}{\Sigma(\phi/\nu)}\right| = 98.3$ $\frac{\phi_{2P}}{|\phi_{1N}|} = 0.60$ $\frac{\phi_{2Pb}}{\phi_{1P,1N,2P}} = 0.76$ $\frac{\phi_{3P}}{|\phi_{2N}|} = 1.08$ $r_{1Na} = r_4 = 0.52f$ and $r_{1Na} = r_6 = 0.49f$ $r_{1Nb} = r_8 = 0.63f$ $\frac{\nu_{1N}}{M} = \frac{\nu_2 + \nu_3 + \nu_4}{3} = 49.4$ $v_{2Pa} = v_5 = 31.1$ $\frac{1}{M} = \frac{d_3 + d_4 + d_5 + d_6 + d_7 + d_8}{3} = 0.15f$ $v_{2N}\triangle - v_{2N}\square = v_7 - v_8 = 16.6$ $n_{2N}\triangle = n_7 = 1.71300 < n_{2N}\square = n_8 = 1.83400$

13. A wide-angle lens according to claim 7 having the following numerical data:

| | $f = 100, F_{NO} 1:3.6$, angle of view $2\omega = 89.1°$ | | | |
|---|---|---|---|---|
| | $r_i$ | $d_i$ | n | $\nu$ |
| 1 | 562.493 | 13.055 | 1.51633 | 64.1 |
| 2 | 4109.489 | 0.556 | | |
| 3 | 117.132 | 6.944 | 1.83400 | 37.2 |
| 4 | 59.721 | 12.639 | | |
| 5 | 105.499 | 6.111 | 1.69680 | 55.5 |
| 6 | 51.399 | 14.389 | | |
| 7 | 181.228 | 5.555 | 1.69680 | 55.5 |
| 8 | 59.444 | 12.278 | | |
| 9 | 158.331 | 32.777 | 1.68893 | 31.1 |
| 10 | −315.879 | 0.833 | | |
| 11 | 136.493 | 43.000 | 1.51633 | 64.1 |
| 12 | −77.146 | 30.417 | | |
| 13 | 1333.316 | 15.278 | 1.71300 | 53.8 |
| 14 | −42.833 | 4.167 | 1.83400 | 37.2 |
| 15 | 129.104 | 2.361 | | |
| 16 | 1291.239 | 9.500 | 1.71300 | 53.8 |
| 17 | −78.777 | | | |

$\left|\frac{\phi_{1N,2P}}{\Sigma(\phi/\nu)}\right| = 107.7$ $\frac{\phi_{2P}}{|\phi_{1N}|} = 0.59$ $\frac{\phi_{2Pb}}{\phi_{1P,1N,2P}} = 0.82$ $\frac{\phi_{3P}}{|\phi_{2N}|} = 1.10$ $r_{1Na} = r_4 = 0.60f$ and $r_{1Na} = r_6 = 0.51f$ $r_{1Nb} = r_8 = 0.59f$ -continued $$\frac{\nu_{1N}}{M} - \frac{\nu_2 + \nu_3 + \nu_4}{3} = 49.4$$

$$\nu_{2Pa} = \nu_5 = 31.1$$

$$\frac{1}{M} \cdot \frac{d_3 + d_4 + d_5 + d_6 + d_7 + d_8}{3} = 0.19f$$

$$\nu_{2N}\boxminus - \nu_{2N}\boxplus = \nu_7 - \nu_8 = 16.6$$

$$n_{2N}\boxminus = n_7 = 1.71300 < n_{2N}\boxplus = n_8 = 1.83400$$

14. A wide-angle lens according to claim 7 having the following numerical data:

f = 100, F$_{NO}$ 1:4.6, angle of view 2ω = 84.2°

| | $r_i$ | $d_i$ | n | ν |
|---|---|---|---|---|
| 1 | 359.349 | 6.410 | 1.51633 | 64.1 |
| 2 | 1270.843 | 0.251 | | |
| 3 | 90.157 | 3.902 | 1.83400 | 37.2 |
| 4 | 40.284 | 7.316 | | |
| 5 | 59.640 | 3.902 | 1.63854 | 55.4 |
| 6 | 37.589 | 15.607 | | |
| 7 | −179.126 | 3.623 | 1.56883 | 56.3 |
| 8 | 79.220 | 4.403 | | |
| 9 | 168.052 | 11.162 | 1.68893 | 31.1 |
| 10 | −128.617 | 0.251 | | |
| 11 | 82.431 | 46.180 | 1.51633 | 64.1 |
| 12 | −60.337 | 19.439 | | |
| 13 | 425.008 | 31.1 | 1.71300 | 53.8 |
| 14 | 35.185 | 9.755 | 1.83400 | 37.2 |
| 15 | 106.297 | 2.439 | | |
| 16 | 290.343 | 4.515 | 1.71300 | 53.8 |
| 17 | 61.313 | | | |

$$\left|\frac{\phi_{1N,2P}}{\Sigma(\phi/\nu)}\right| = 124.1$$

$$\frac{\phi_{2P}}{|\phi_{1N}|} = 0.62$$

$$\frac{\phi_{2Pb}}{\phi_{1P,1N,2P}} = 0.83$$

$$\frac{\phi_{3P}}{|\phi_{2N}|} = 0.97$$

$r_{1Na} = r_4 = 0.40f$ and $r_{1Na} = r_6 = 0.38f$ $r_{1Nb} = r_8 = 0.79f$ $$\frac{\nu_{1N}}{M} - \frac{\nu_2 + \nu_3 + \nu_4}{3} = 49.6$$

$$\nu_{2Pa} = \nu_5 = 31.3$$

$$\frac{1}{M} \cdot \frac{d_3 + d_4 + d_5 + d_6 + d_7 + d_8}{3} = 0.13f$$

$$\nu_{2N}\boxminus - \nu_{2N}\boxplus = \nu_7 - \nu_8 = 16.6$$

$$n_{2N}\boxminus = n_7 = 1.71300 < n_{2N}\boxplus = n_8 = 1.83400$$

* * * * *